United States Patent [19]

Woffinden et al.

[11] Patent Number: 4,631,660
[45] Date of Patent: Dec. 23, 1986

[54] ADDRESSING SYSTEM FOR AN ASSOCIATIVE CACHE MEMORY

[75] Inventors: Gary A. Woffinden, Scotts Valley; Gene M. Amdahl, Atherton; Donald L. Hanson, Los Altos Hills, all of Calif.

[73] Assignee: Amdahl Corporation, Sunnyvale, Calif.

[21] Appl. No.: 527,674

[22] Filed: Aug. 30, 1983

[51] Int. Cl.[4] .............................................. G06F 12/08
[52] U.S. Cl. ..................................................... 364/200
[58] Field of Search ... 364/200 MS File, 900 MS File; 365/49, 230

[56] References Cited

U.S. PATENT DOCUMENTS

| | | | |
|---|---|---|---|
| 4,045,781 | 8/1977 | Levy | 364/200 |
| 4,168,541 | 9/1979 | DeKarske | 364/200 |
| 4,381,541 | 4/1983 | Baumann | 364/200 |
| 4,400,770 | 8/1983 | Chan | 364/200 |
| 4,441,155 | 4/1984 | Fletcher | 364/200 |

*Primary Examiner*—Raulfe B. Zache
*Assistant Examiner*—Florin Munteanu
*Attorney, Agent, or Firm*—Fliesler, Dubb, Meyer & Lovejoy

[57] ABSTRACT

A memory system which comprises a mainstore for storing lines of data and a buffer store for storing lines of data that are a subset of the data stored in the main store. The buffer store is comprised of a plurality of associativities. A line of data stored in the buffer having a given address may be stored in any one of the plurality of associativities. A tag store stores a tag for the associativities. A field from a buffer store address is compared with the stored tag in the tag store to produce a data selection signal for selecting from among the plurality of associativities the proper line of data. When the buffer has only two associativities, a bit in the buffer store address which has different values for the two associativities is tested, and thus the proper line of data is selected. The bit position is indicated by a pointer stored in the tag array. A selection of one of two data lines is made prior to a determination of the presence or validity of data in the buffer store.

8 Claims, 2 Drawing Figures

ADDRESSING SYSTEM FOR AN ASSOCIATIVE CACHE MEMORY

BACKGROUND OF THE INVENTION

The present invention relates to the field of instruction controlled digital computers and specifically to methods and apparatus associated with storage units in data processing systems.

It is common in data processing systems to have a memory hierarchy wherein buffer memories of relatively low capacity, but of relatively high speed, operate in cooperation with main memories of relatively high capacity but of relatively low speed. It is desired that the vast majority of accesses, either to fetch or store information, be from the buffer memory so that the overall access time of the system is enhanced. In order to have the vast majority of accesses come from the relatively fast buffer memory, information is exchanged between the main memory and the buffer memory in accordance with predetermined algorithms.

The efficiency with which a buffer memory works in decreasing the access time of the overall system is dependent on a number of variables. For example, the capacity of the buffer memory, the capacity of the main store, the data transfer rate between stores, the replacement algorithms which determine when transfers between the main store and buffer are made, and the virtual to real address translation methods and apparatus.

Typically, a buffer system consists of data, arranged in lines of bytes. Tags are used to indicate the origin of the data from within a large storage, such as main store. Data is transferred to and from main store a line at a time so all bytes in a line are either resident or not in the buffer. Based on this operation, a tag is associated with a line and indicates whether that entire line is present in the buffer or not. Thus, there is a one to one correspondence between tags and lines of data.

Buffer memories typically have more than one associativity of a given address to memory locations. With multiple associativities, there are two decisions which must be made in oder to complete a buffer access. First, a decision must be made as to whether the data is in the memory. Second, a decision must be made as to which one of the possible locations contains the data.

In the prior art, these decisions have been made by examining each associativity. In a case where there are N associativities, N matches are performed, one for each associativity, to determine whether or not the data is there for any associativity. If none of the N associativities finds a match, then the data is not there. If any associativity finds a match and thereby indicates that the data is there, then that indication also indentifies where the data is. In the prior art, both decisions have been made together after N matches of complete information for all N associativities.

Matches using complete information require a comparison of all the addressing and all the control information associated with a line of data. Such matches of complete information require a large amount of circuitry and tend to take excessive time. The problem is particularly severe in virtual addressing systems because in such systems the amount of address information and control information required is even greater than in real addressing systems. The translation information in a virtual system adds significantly to the amount of information included within the match process.

In accordance with the above background, problems exist in the amount of time required to do matches, particularly in virtual address systems. There is a need for improved memory systems which overcome these problems.

SUMMARY OF THE INVENTION

The present invention is a high performance buffer memory system. The buffer memory system includes two or more associativities. A tag store stores a single tag for all associativities. A logical circuit combines a field from the requesting address with the stored tag to produce a logical output. That logical output is used to make selection from among the associativities in the buffer store. This decision is made and data is selected from one of the associativities at a time prior to the time when it is known whether or not the selected data is valid. At a later time, the decision of whether or not the addressed data is valid is made.

In one particular embodiment, the tag contains a subset of the requesting address which caused the data to be moved into the buffer. In such an embodiment, the logic circuit is a comparator which compares the requesting address field stored in the tag with the corresponding field in the requesting address.

The data select match uses a data select tag which is a smaller tag size than that which would be required to uniquely select the data, a replacement algorithm is employed to insure that data lines which might otherwise be confused are never resident in the buffer at the same time. If a data line is to be moved into the buffer which cannot be distinguished for data selection purposes from a data line resident in the buffer, the the data line being moved into the buffer replaces the line with the matching data select function so that no actual ambiguity within the buffer ever exists.

In a second embodiment, the present invention includes a buffer store with N associativities and data selection among those associativities is made using N−1 matches. If any of the N−1 data select tags indicate a match, then data from that matching associativity is selected. If none of the N−1 data select tags indicate a match, then data from the associativity N is selected. In one particular embodiment, N is two so that there are two associativities. The data selection match is performed using N−1, that is 1, match. Where the two associativities are named primary and alternate, a match is made only on one of the two, for example, on the primary, in order to select data either from the primary or from the alternate. For this reason, no data selection match circuitry is required for the other associativity, namely for the alternate associativity in the example given.

A third embodiment reduces the amount of storage required in the data select tag for buffers with two associativities. In this embodiment, the data select match function is not a comparison but rather a selection of a particular bit of the requesting address. If the selected address bit is a 1, primary data is selected. If the selected address bit is a 0, alternate data is selected. The data select tag field contains a binary encoding, or pointer, of the bit position to be examined. Since the addresses of the data in the two associativities must differ in at least one bit position, the data select tag merely contains a pointer to one of the bit positions in which they differ, in which the primary address bit is a 0 and the alternate address bit is a 1. Therefore, the data select tag need not store all of the address bits to match on, but rather it need only store a pointer to a differing bit position. A further extension of this embodiment is to store an additional bit in the data select tag to indicate whether a 0 in the selected bit position represents the primary or alternate associativity.

The data select match function itself is unimportant. The only requirement is that when a new line of data is to be brought into the buffer, it be distinguishable from lines residing in other associativities. If a line to be moved in is indistinguishable from a line already residing in one of the associativities, then the line to be moved in must replace the matching line.

The combination of the subset tag using an ambiguity removal algorithm, coupled with a system which uses N−1 matches in a buffer which has N associativities provides an improved and efficient data selection mechanism. Because of the small number of bits that are required to make a data selection, the data selection is made very quickly. The data can, therefore, be used to commence subsequent processing even before it is known whether or not the data is valid. If after the much longer but complete comparison indicates that the data is invalid, the subsequent processing can be terminated. However, in those situations where the subsequent complete match indicates that the data selected is valid, the continued processing of the already selected data has obtained a significant increase in performance since no delay was encountered in waiting for a complete match.

In accordance with the above summary, the present invention performs a match at much higher speed than if a complete match of the entire address and control information were carried out. Also, the circuitry required in the comparator is less.

The invention is particularly useful in high-performance virtually-addressed buffer systems where the match information tends to be large.

DETAILED DESCRIPTION

With reference to the drawings, detailed description of the preferred embodiment of the present invention is provided.

Figure 1:
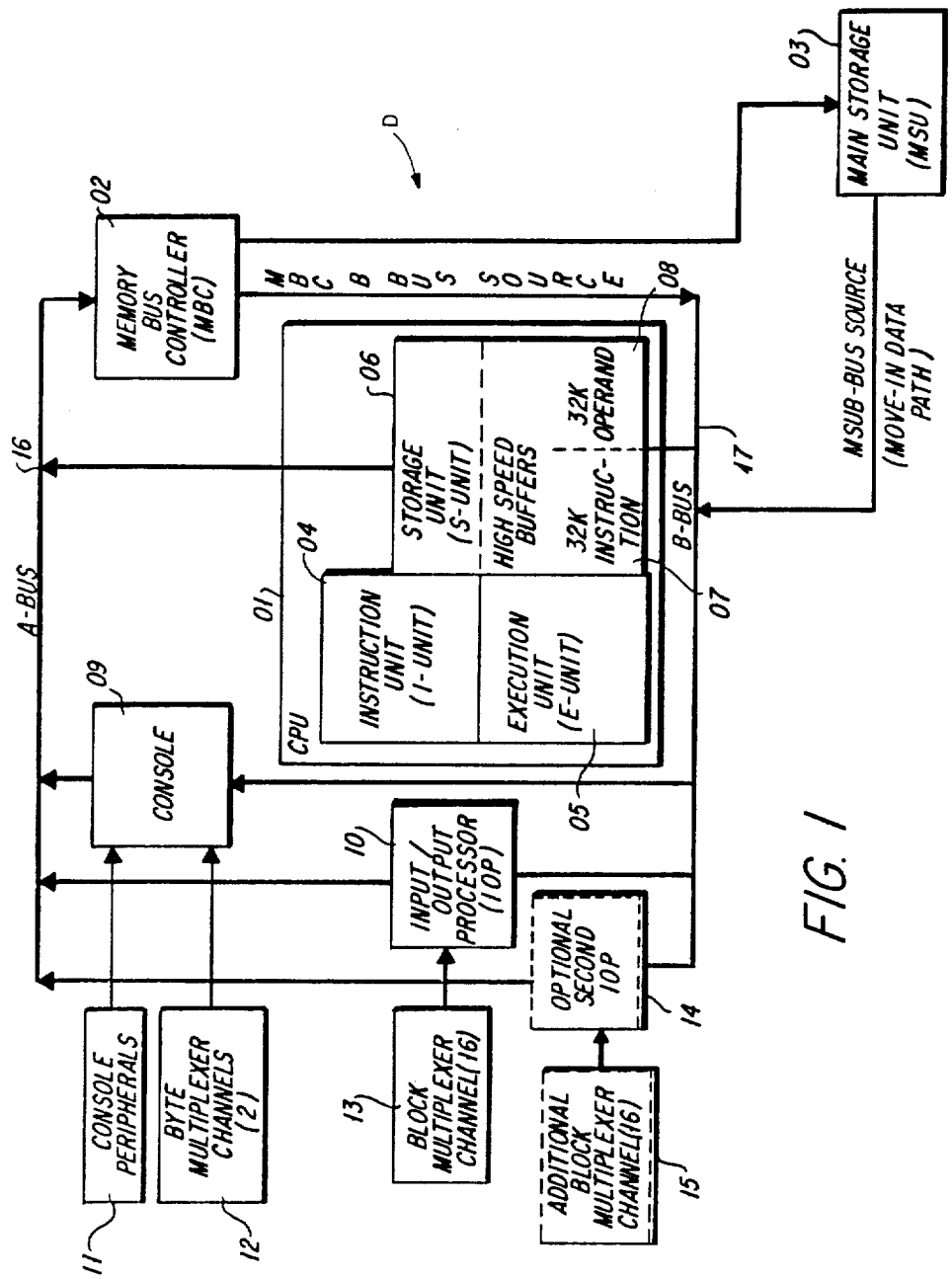
FIG. 1 is a block diagram system overview of a data processing system which includes the present invention.

FIG. 1 shows a block diagram of a system overview of the data processing machine D which employs the present invention. The present invention is most closely associated with the central processing unit 01, the memory bus controller, 02, and a primary storage means or main storage unit 03. The central processing unit 01 includes five subparts as follows: the instruction unit 04 (I-UNIT) which fetches, decodes, and controls instructions and controls the central processing unit 01; the execution unit 05 (E-UNIT) which provides computational facilities for the data processing machine D; the storage unit 06 (S-UNIT) which controls the data processing machine's instruction and operand storage and retrieval facilities; a secondary storage means or the instruction buffer 07 which provides high-speed buffer storage for instruction streams; and a secondary storage means or the operand buffer 08 provides high-speed buffer storage for operand data.

Other major parts of a data processing machine as shown in FIG. 1 include the input-output processor (IOP) 10 which receives and processes input-output requests from the central processing unit 01 and provides block multiplexer channels; the console 09 which communicates with the central processing unit 01 to provide system control and byte multiplexer channels; the memory bus controller (MBC) 02 which provides main memory and bus control, system wide coordination of functions and timing facilities; and the main storage unit 03 which provides system large capacity memory. A second input-output processor 14 and additional multiplexer channels 15 may be included as shown in FIG. 1. Though not shown in the Figures, the data processing machine D of the present invention may have additional CPU's.

The data processing shown in FIG. 1 employs a dual bus structure: the A-bus 16 and the B-bus 17. The A-bus 16 carries addresses and data from the console 09, the input-output processor 10, and the central processing unit 01 to the memory bus controller 02. The B-bus 17 carries data from the memory bus controller 02 and the main storage unit 03 to the console 09, the input-output processor 10 and the central processing unit 01.

For a more detailed description of the system overview shown in FIG. 1 refer to the related application Ser. No. 527,678 entitled "VIRTUALLY ADDRESSED CACHE" invented by Gene Myron Amdahl, Donald Laverne Hanson and Gary Arthur Woffinden, filed contemporaneously herewith and owned by a common assignee.

Figure 2:
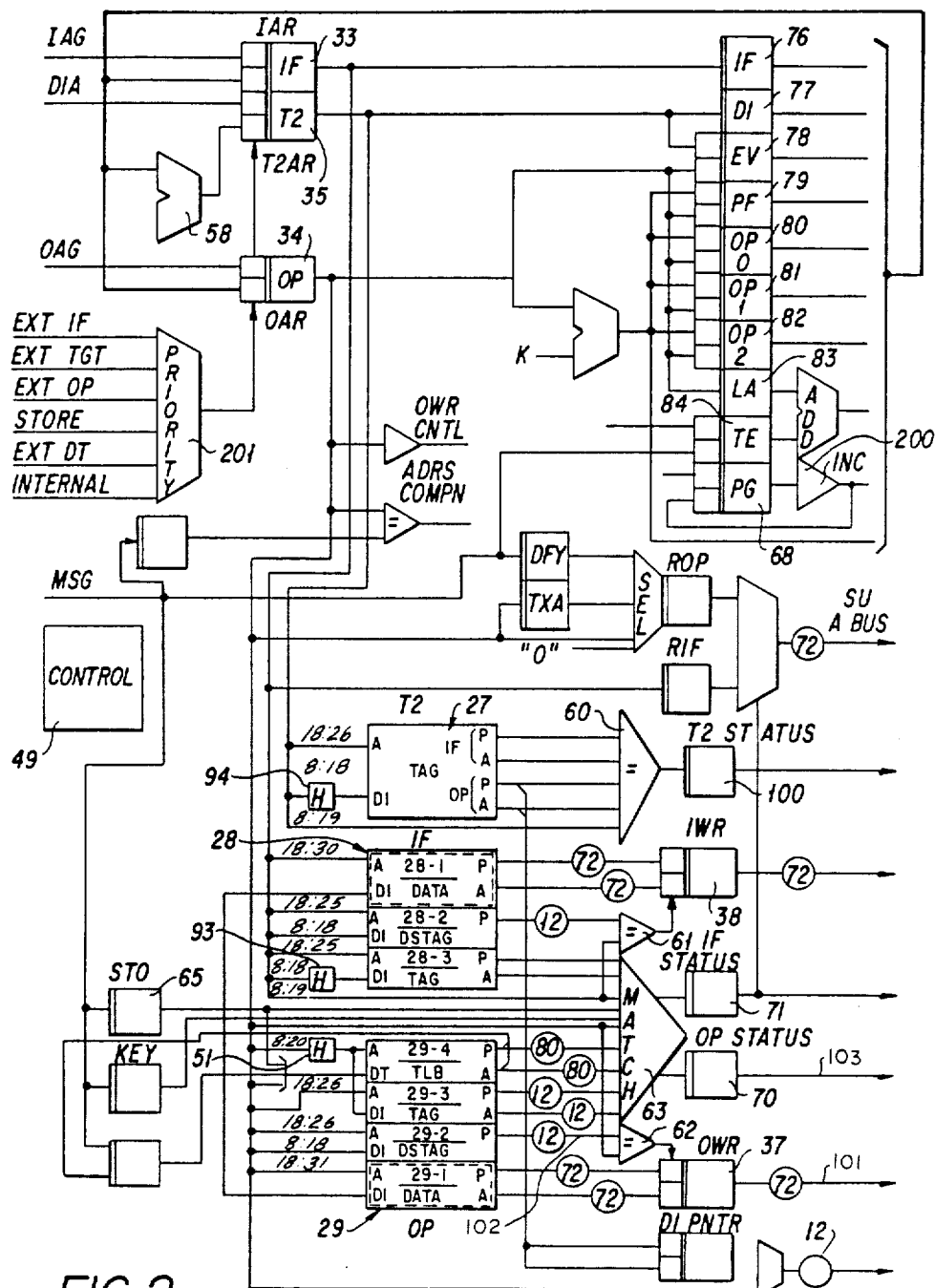
FIG. 2 is a block diagram of the addressing mechanism in the data processing system employing the present invention.

The present invention is concerned primarily with the selection of data that is stored in the high speed buffers, such as the instruction buffer 28 and the operand buffer 29 shown in FIG. 2. As explained in the summary of the invention, the buffers are divided into a primary P and an alternate A associativity.

When an access to the buffer such as the operand buffer 29 is made, an operand address is supplied to the operand address register 34. The operand address is a 32-bit word in the embodiment shown in FIG. 2. Bits 18–31 of the operand address are utilized to address the data in the data portion 29-1 of the operand buffer 29. Both the primary and the alternate lines of data are supplied in response to bits 18–31 into the operand word register 37.

The data select match is accomplished using address bits 8–18 of the requesting address matched against the corresponding bits stored in the data select tag 29-2 portion of the operand buffer 29. The comparison is accomplished in comparator 62. The output of comparator 62 is supplied at the operand word register 37 and operates to select either the primary or alternate associativity as data to be supplied by the operand word register 37 and 72-bit line 101. In the preferred embodiment, the comparator 62 operates to select the primary associativity P upon the detection of a match and the alternate associativity A when no match occurs. Thus, the data is only compared over the primary associativity P as can be seen at line 102 providing the data select tag DSTAG for the primary associativity P to comparator 62.

The instruction address register 33 supplies addressing data to the instruction buffer 28 in a manner similar to that described by the operand buffer 29. The comparator 61 compares the data select tag for the primary associativity P from the data select tag portion 28-2 of the instruction buffer 28 with the corresponding bits 8-18 of the requesting address from the instruction address register 33. If a match occurs, then the primary associativity P is selected for the instruction word register 38 if no match occurs, then the alternate associativity A is selected.

Of course, other arrangements for the data select tag in either the instruction buffer 28 or the operand buffer 29 may be utilized as discussed above in the summary of the invention. The important characteristic of the present invention is the selection of either the primary or alternate associativity based upon a comparison performed only over one of the two associativities.

The following describes the operation of accessing the buffer including the data select match according to the present invention.

1. 2.6 Data Select Tags

The Data Select Tags are used to select between primary and alternate data supllied by both associativities of the buffers 28, 29. There is a one to one mapping between the Data Select Tags in the primary P associativity and the primary Data Resident Tags. Each data select tag entry consists of logical address bits 8-18 or, in the alternate embodiment, of a pointer that indicates a bit location in the address stored in the primary P associativity that includes a bit that differs from the same bit in the address stored in the alternate A associativity. Since data selection is a binary decision, only the primary tags are stored in the buffers 28, 29.

2. 3.3.6 Data Select Match.

At the beginning of an access to the Operand buffer 29 or the Instruction buffer 28, the requested data may reside in either one of the associativities. Before data can be loaded into the destination register, either instruction word register 38 or to operand word register 37, a decision as to which associativity contains the data must be made. Data Select Match refers to the function which selects between data returned by the primary (P) and the alternate (A) associativities. Data Select Match is the output from the IF comparator 61 or from the OP comparator 62.

The most salient characteristic of Data Select Match from comparator 61 or 62 is that it must be fast enough to select data from one or the other associativity for loading into the destination register (either OWR 37 or IWR 38) regardless of whether the requested data does or does not reside in the buffer 28, 29. The actual presence of the requested data in the buffer 28, 29 is the responsibility of Data Resident Match from Comparator 63, which is not known in time to perform the selection of primary P or alternate A associativity.

Since the Data Select Match selection is binary, only one associativity needs testing for the presence of the requested data. When the test indicates presence, control signals select data from this associativity. When the test does not indicate presence, data from the other associativity is selected.

For both the IF and OP pipeline, the test involves matching the Effective Address Field of a data select tag DS TAG 29-2, 28-2 entry for the primary associativity with bits 8-18 of the requesting address. Alternatively, the effective address field is replaced with a pointer indicating a bit location in the address that differs from the address stored in the alternate A associativity. The pointer may also include a bit that indicates whether the indicated bit position in the address stored in the primary P associativity is 1 or 0. The pointer can be generated by a hash of the requesting address from the IF register 33 or the OP register 34.

Since bits 0-7 of the request address do not participate in the match, two different lines which map to the same slot in the buffer 28, 29 and have bits 8-18 in common could be confused with one another. The Buffer Line Replacement algorithm is biased by Data Select Match to assure that this situation does not occur. An example of the Buffer Line Replacement algorithm can be understood from the following description of buffer accessing.

3. Buffer Accessing First OP Buffer Request-TLB Empty

In the example to be described, it is assumed that the translation lookaside buffer TLB 29-4 is empty. With the TLB empty, the valid bits in each entry indicate invalid and the eviction pending bits in each entry are reset to 0 to indicate no pending evictions. In addition, the buffer 28, 29 is assumed to be empty and therefore the valid bits in the tag array indicae invalid. With these starting assumptions, the I-unit supplied virtual operand address into the operand register 34. The contents of the OAR register 34 are stored into one of the address storage registers (ASR's), for example, register 80. In the first access, the address in register 34 goes to the operand array 29 and in particular addresses the TLB 29-4. The comparator 63 looks for a match. Since the TLB is empty, the result of the match indicates that there is no valid TLB entry and an invalid indication is latched into the OP status register 70. The control logic 49, in the CPU 01 or elsewhere, across line 103 examines the contents of the status register 70 and upon receiving the invalid indication, initiates a translation process. The translation process is the well-known virtual-to-real translation process defined in the IBM System/370 Principles Of Operation.

When the translation is complete, the virtual address from register 80 is returned to the OAR 34 and the second access addresses the operand array 29 and particularly the TLB 29-4. The results of the translation are written into the TLB at the address location specified by the address in the OAR 34. Specifically, the segment base is written into the segment base field, the logical address is written into the logical address field, and the system address is written into one of the two system address fields, for example, into the System Address 0 (SA0) field. When the system address is written into SA0, the flipper bit is set to 0 and the eviction pending bit for the System Address 0 real address remains reset to 0. Additionally, the valid field is set to mark the new TLB entry valid. When the system address is written into the System Address 0 field, the system address is also entered into a linked list within the reverse translation mechanism in the manner described in the co-pending application, APPARATUS FOR REVERSE TRANSLATION (AMDH 3219) Ser. No. 528, 091, filed comtemporaneously herewith and owned by an Assignee in common with the present invention, now U.S. Pat. No. 4,551,797.

In a third access, the logical address from register 80 is again written into the OAR register 34 and again accesses the operand buffer, particularly the TLB 29-4, the tag array 29-2 and the data select tag array 29-2. In the third access, the comparator 63 finds a TLB match and sets the TLB match indication into the OP Status register 70 to indicate the TLB match. At the same time, the tag comparison results in no match and the tag no match indication is also stored in the OP Status register 70.

Control designated by box 49 recognizes the tag no-match indication in the register 70 across line 103 and initiates a main store access to obtain the requested line of data. Control 49 determines whether to replace either the primary or the alternate associativity according to the replacement algorithm which is biased by the results of the data select match performed in the comparators 62 and 63. The comparator 62 compares bits 8:18 of the requesting address to the corresponding bits from the primary output of the data select tag array 29-2. If the comparator 62 indicates a match, then the replacement decision is forced to the primary associativity. Comparator 63 performs an analogous comparison. Specifically, comparator 63 compares the bits 8:18 of the requesting address to corresponding bits accessed from the tag array 29-3 and the TLB array 29-4. If the comparator 63 indicates an alternate associativity data selection match, then the replacement algorithm is forced to the alternate associativity. If neither comparator 62 nor comparator 63 indicates a data selection match, then the associativity is arbitrarily selected. For example, the arbitrary replacement decision typically selects the least recently used replacement algorithm such as is described in detail in above-referenced application, VIRTUALLY ADDRESSED CACHE.

Main store accesses the real address location in the manner described in the above-referenced co-pending application, APPARATUS FOR REVERSE TRANSLATION.

After the accessed mainstore data is returned, the fourth access of array 29 occurs and the data is stored into the data array 29-1 at the location specified by the logical address which is again transferred from register 80 to the operand register 34. The data is written into the associativity indicated by the replacement decision. At this time, the tags in the tag array 29-3 are written with a pointer which points to the system address field in the TLB 29-4 containing the system address used to access the data in mainstore. Additionally, the tag is marked valid and the data select tag is written into the tag array 29-3, if required. Further details concerning the data select tag are described in the above-referenced application entitled VIRTUALLY ADDRESSED CACHE.

If the data is written into the primary associativity, then the primary data select tag 29-2 is written with bits 8:18 of the requesting address in the operand address register 34. If data is written into the alternate associativity, then the primary data select tag is not written.

In the fifth access of buffer 29, the logical address from the register 80 is transferred to the OAR register 34 the TLB and the tag both indicate a match. At the time that we get the TLB and tag match, the comparator 62 selects either the primary or alternate data from the data array 29-1 for storage into the OWR register 37.

If the data is present in the primary associativity, then the data select comparator 62 indicates primary data select match and selects primary data into the operand word register 37. If the data is present in the alternate associativity, then the data select comparator 62 does not indicate a primary data select match and selects alternate data into the operand word register 37.

At this time, the first OP buffer 29 request is complete. If a subsequent OP buffer 29 request is for the same line of data, then only the fifth access is required. Subsequent OP buffer 29 requests for data within the same page as the first OP buffer request but for a different line need only perform the third, fourth and fifth accesses and no explicit virtual-to-real translation is required.

4. Second Operand Buffer Request to Same TLB Location As First Request

In a further example, a new and second buffer request requests access to a location which maps to the same TLB entry as the first OP buffer request.

With the new request, a translation occurs and, as a result of the translation, the validity bit, the segment base, and the logical address are stored in the same way as described in connection with the first request. However, since the System Address 0 location contains the only identification of the real address location of the corresponding lines resident in the data array 29-1, an eviction process is required in order to remove the lines from the data array, in particular, lines associated with System Address 0 in the example being described.

The eviction process could stop all processing and perform serial searches in the foreground to examine every entry in the tag array and to evict those lines that correspond to the System Address 0. Serial foreground searching, however, has an undesired performance penalty. A preferred implementation, therefore, is to do the eviction processing in the background.

A mechanism is provided which permits the eviction process to be carried out in the background and which permits a new TLB entry to be made. The mechanism uses an additional system address field (SA1 field) along with the SA0 field, a flipper bit to indicate which of two system addresses is the currently active address and two eviction pending bits, one for each system address to indicate eviction pending status of that system address.

Using this mechanism, the TLB entry for the second request can be made as follows. The segment base and the logical address are stored in the same way as described in connection with the first request. Also, the new system address is stored in the other real address location, System Address 1, (SA1), and the flipper bit is set to 1 to indicate that SA1 is the currently active real address. The eviction pending bit for the currently active real address, SA1, remains reset. An eviction pending bit is set for the previously active real address, System Address 0. System Address 0 is thereafter in the eviction pending state and therefore cannot be used until all lines which correspond to that system address in the data array 29-1 have been removed. Until the eviction pending state is released and the System Address field is thereby made available, no further TLB entries can be made at this location.

5. Eviction

Evictions must be processed in an efficient manner. Failure to remove evictions may cause them to accumulate and therefore may cause the processing to stop.

The handling of evictions involves a three-phase process. The three-phase process is to find a system address in the eviction pending state, carry out the eviction, and finally release the eviction pending state for the sytem address.

In one mechanism for finding evictions, the control 49 monitors each TLB entry accessed. If the eviction pending bits are turned on for an accessed entry, a background eviction process is commenced. This monitoring of accessed TLB entries provides a quasi-random search through the TLB. It is possible that not all locations in the TLB are examined and that eviction pending states may tend to accumulate in addresses that are not often accessed by addresses generated during the processing of the current instruction stream. Therefore, an additional mechanism for finding evictions is provided that guarantees that the entire TLB array will be searched for pending evictions over some period of time. This mechanism takes advantage of cycles which are unused by the CPU. An empty cycle TLB location counter, for example, the Purge TLB counter 68, is maintained. The counter steps through every TLB location in an orderly manner so that every available empty cycle is used to examine the next sequential location.

Under an initial condition, the purge TLB counter 68 is set at some initial count, for example, all zeroes. The counter wraps around at its highest address to the lowest address so the starting point of the counter is not important. The purge TLB counter 68 is an 8-bit counter so that it can access each one of the 256 sets of locations in the TLB. Counter 68 can be any size large enough so that every address in the TLB eventually is accessed as a result of the counter operation.

Whenever the priority mechanism 201 has no other request requesting access to the OAR 34, it selects the address from the purge TLB counter 68 through the incrementer 200. The same address is then clocked into the purge TLB register 68. The address in OAR 34 is used to address the TLB for the purpose of examining the status of the eviction pending bits. The examination is carried out in the same way as any other access to the TLB. In this way, otherwise unused OAR cycles are used to linear search the TLB for pending evictions. The combination of the empty cycle counter accesses and of the instruction processing accesses provides a two-pronged search of the TLB for finding pending evictions.

The actual find process for finding a pending eviction is carried out as follows. Each address for accessing buffer 29 comes into the OAR register 34 and, among other things, addresses the TLB 29-4. The addresses entered into the OAR 34 can come either from the current instruction stream or they can come from the purge TLB counter 68. The eviction pending bits accessed from the TLB are examined by the control 49. If control 49 finds an eviction pending bit on and if the eviction controller is available, then an eviction process is initiated. The eviction controller is marked busy and the eviction register 78 is loaded with the TLB pointer (pointing to the pending eviction concatenated with low-order zeros) from the OAR register 34. The 9-bit pointer address indicates which system address requires an eviction.

Now that the eviction pending has been found, the actual eviction process must be performed. The eviction control does a sequential search of the tag array using the duplicate set of tags so it doesn't interfere with the foreground processing. For every tag accessed, if the TLB pointer in the tag matches the TLB pointer held by the eviction controller, a move-out is initiated. The move-out operation either discards the data or moves it to mainstore. The result is removal of the line from the buffer 29.

In order to carry out the eviction, the address in the eviction register 78 is gated into the T2 AR register 35 through the conditional incrementer 58 without incrementing. The register 35 accesses the tag2 array 27, searching for entries which point to the system address being evicted. The TLB pointer from the tag array 27 and the TLB pointer in the tag 2 register 35 are compared in comparator 60 and the results are stored in the T2 status register 100. If the results indicate a match, control 49 causes the data to be moved out from the buffer and updates mainstore with the data moved out, if required. If the status in register 100 indicate no match, or after the move-out is complete, the address from register 78 is incremented through incrementer 58 to form a new address in register 35 which in turn is stored in register 78. At this time, the process again repeats until all possible locations in the tag have been processed. At this time, the buffer has been cleared of all lines to be evicted and the eviction is complete. The system address field can now be released from the eviction pending state by resetting the eviction pending bit.

The release mechanism operates as follows. The TLB pointer in the register 78 is selected into the OAR register 34 and addresses the TLB 29-4 and the system address which initiated the process has its eviction pending bit reset. When the eviction pending bit is reset the system address will be deleted from a linked list in the reverse translation mechanism as described in the co-pending application entitled APPARATUS FOR REVERSE TRANSLATION, referenced above. When the eviction pending bit is reset, the system address entry thereafter becomes available for reuse.

At this time, additional requests can be processed in the manner previously described for the first and second requests. The eviction pending states will be monitored and evictions made in the background in the manner described.

In accordance with the above examples, the buffer line replacement algorithm maintains the integrity of data in the primary P and alternate A associativities.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A memory system comprising:
   a main store for storing lines of data;
   a buffer store, accessed by a requesting address, for storing lines of data that are a sub-set of the lines of data stored in said main store, said buffer having a first and second associativity;
   said first associativity having a line of data from a first address in said buffer store and said second associativity having a line of data from a second address in said buffer store;
   pointer means for storing a data select pointer that indicates a bit location within said first and second addresses which has a first value in said first address at said bit location and a second value in said second address at said bit location; and
   data selection means for receiving said data select pointer to access said bit location in said requesting address to select between said first and second associativities.

2. The apparatus of claim 1, wherein:

said data select pointer includes a field for indicating whether said bit location is non-zero in said first address or said second address.

3. The apparatus of claim 1, wherein:
said pointer means includes a tag array for storing said data select pointers for all address pairs in said buffer store.

4. A memory system, comprising:
a main store for storing lines of data at addresses uniquely identifying a location in said main store for each of said lines of data;
a buffer store for storing a sub-set of said lines of data identified by requesting addresses, said buffer store including a number N of associativities so that each requesting address identifies N locations, one in each of said N associativities, at which a line of data identified by said requesting address may be stored;
data selection means, responsive, to said requesting address, receiving information from N−1 of said N associativities for performing in parallel N−1 logical operations between the requesting address and said information to generate a data select signal indicating one of said N associativities; and
means, responsive to said data select signal, for enabling the indicated one of said N associativities to be accessed.

5. The memory system of claim 4, wherein:
said data selection means includes a means for storing a data select tag for each line of data in N−1 of said N associativities; and
means, responsive to said requesting address, for comparing said requesting address with data select tags from said N−1 associativities.

6. The memory system of claim 4, wherein said buffer store includes two associativities, that is N equals 2, and said data selection means performs a match on one of said two associativities whereby data from the one associativity is selected if a match occurs and data from the other associativity is selected if no match occurs.

7. The memory system of claim 5, wherein:
said requesting address includes a requesting number of bits required to uniquely identify a line of data; and
said data select tag includes a fewer number of bits than said requesting number of bits; and further including:
means for controlling the content of said buffer store in order to avoid ambiguity in the lines of data stored in said buffer store.

8. The memory system of claim 5 wherein said tag contains a subset of the requesting address which caused the data to be moved into the data buffer.

* * * * *

UNITED STATES PATENT AND TRADEMARK OFFICE
CERTIFICATE OF CORRECTION

PATENT NO. : 4,631,660

DATED : December 23, 1986

INVENTOR(S) : Gary A. Woffinden, Gene M. Amdahl
Donald L. Hanson & Loren Paul Staley Page 1 of 2

It is certified that error appears in the above-identified patent and that said Letters Patent is hereby corrected as shown below:

On the title page Insert Inventor --Loren Paul Staley-- not included.

Column 1, line 44, change "oder" to --order--.

Column 2, line 30, after "data[,]" should be -- . Although the data selection tags do not uniquely select the data, --.

Column 3, line 37, change "The" to --This--.

Column 4, line 19, after "processing" should be --machine--.

Column 4, line 57, change "and" to --over--.

Column 5, line 20, change "supllied" to --supplied--.

Column 5, line 34, insert --two-- after "the".

Column 6, line 20, change "indicae" to --indicate--.

UNITED STATES PATENT AND TRADEMARK OFFICE
CERTIFICATE OF CORRECTION

PATENT NO. : 4,631,660

DATED : December 23, 1986

INVENTOR(S) : Gary A. Woffinden, Gene M. Amdahl
Donald L. Hanson & Loren Paul Staley Page of 2

It is certified that error appears in the above-identified patent and that said Letters Patent is hereby corrected as shown below:

Column 7, line 54, after "34" should be -- and again accessed the operand array 29-1. At this time--.

Column 11, line 19, after "responsive" delete ","

Signed and Sealed this

Twenty-fourth Day of November, 1987

Attest:

DONALD J. QUIGG

Attesting Officer

Commissioner of Patents and Trademarks